United States Patent
Poovey

(10) Patent No.: US 7,283,698 B2
(45) Date of Patent: Oct. 16, 2007

(54) BENDING ELEMENT LIGHT SWITCH

(75) Inventor: Gary Neal Poovey, Escalon, CA (US)

(73) Assignee: Gary Poovey, Escalon, CA (US)

(*) Notice: Subject to any disclaimer, the term of this patent is extended or adjusted under 35 U.S.C. 154(b) by 211 days.

(21) Appl. No.: 10/928,769

(22) Filed: Aug. 30, 2004

(65) Prior Publication Data
US 2006/0045407 A1 Mar. 2, 2006

(51) Int. Cl.
G02B 6/26 (2006.01)

(52) U.S. Cl. .................. 385/15; 385/16; 385/14; 385/24

(58) Field of Classification Search .......... 385/15, 385/16, 17, 18, 24, 49, 42, 43, 12, 13, 14, 385/132
See application file for complete search history.

(56) References Cited

U.S. PATENT DOCUMENTS

| | | | | |
|---|---|---|---|---|
| 5,261,015 A * | 11/1993 | Glasheen | ...................... | 385/23 |
| 5,367,584 A * | 11/1994 | Ghezzo et al. | ................. | 385/17 |
| 5,703,975 A | 12/1997 | Miller et al. | .................. | 385/16 |
| 6,178,033 B1 | 1/2001 | Ford et al. | ................... | 359/247 |
| 6,519,381 B2 * | 2/2003 | Hatta et al. | .................... | 385/16 |
| 6,594,411 B2 | 7/2003 | Chung | .......................... | 385/16 |
| 6,898,342 B2 * | 5/2005 | Sprague et al. | ............... | 385/20 |
| 6,915,046 B2 * | 7/2005 | Jin et al. | ....................... | 385/47 |
| 6,995,499 B2 * | 2/2006 | Hwang | ........................ | 310/328 |
| 7,072,536 B2 * | 7/2006 | Poovey | .......................... | 385/15 |
| 2002/0097952 A1 * | 7/2002 | Jin et al. | ....................... | 385/18 |
| 2003/0138213 A1 * | 7/2003 | Jin et al. | ....................... | 385/47 |
| 2003/0168942 A1 * | 9/2003 | Iino et al. | .................... | 310/331 |
| 2006/0045407 A1 * | 3/2006 | Poovey | ........................... | 385/9 |

* cited by examiner

Primary Examiner—Brian M. Healy

(57) ABSTRACT

A BENDING ELEMENT LIGHT SWITCH will be used to turn on or off the light signal in one of two adjacent fiber optic channels by the action of the electric field of the light passing through the channels. BENDING ELEMENT LIGHT SWITCH can be made adjacent to each other so that the bending elements will latch together and stay in the state required by means of the shape of the ends of the elements. The bending is accomplished by the response of piezoelectric material to the electric field of light in the fiber optic channel. This will allow information of be stored by the BENDING ELEMENT LIGHT SWITCH that are made to latch. Light of different frequencies may travel in a light channel of appropriate dimensions together without hindering each other. The light that actuates the light switching or latching may be a different frequency than the light signal that is switched on or off. This switch holds the latched position required until light signals of the appropriate wavelength and power in the proper sequence are applied to the BENDING ELEMENT LIGHT SWITCH that can latch to cause the unlatching.

27 Claims, 3 Drawing Sheets

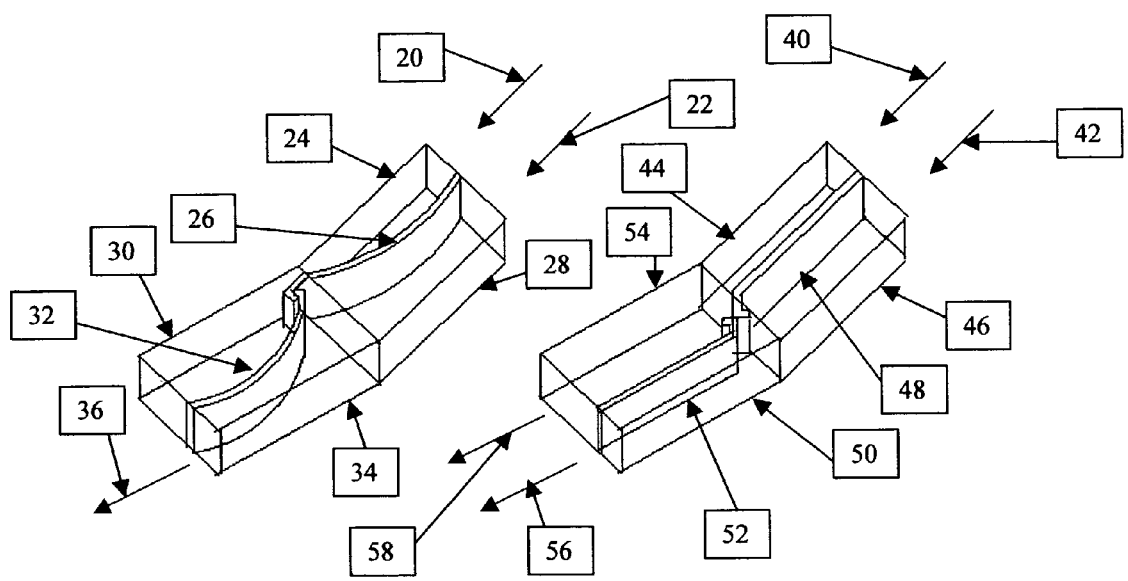
Figure 2 A                    Figure 2 B

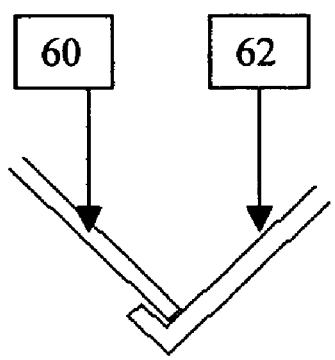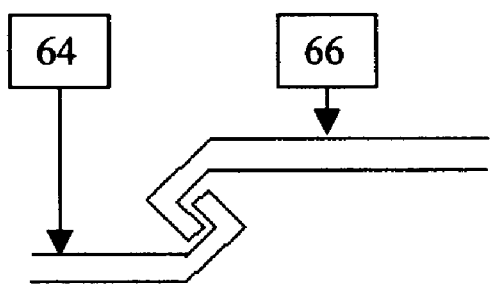
Figure 3 A                    Figure 3 B

BENDING ELEMENT LIGHT SWITCH

BACKGROUND OF THE INVENTION

1. Field of the Invention

This invention relates to a method for switching light signals in an optical wave-guide channel on or off at speeds faster than $10^{-11}$ seconds using light to trigger the switch, in which an element bends to open or close the channel. These switches can be arranged to stay latched until unlatched.

2. Description of the Prior Art

As technology advances communication of three-dimensional drawings, video, and software applications require more information to be communicated at ever-greater speeds in ever grater volumes. Fiber optical channels can handle much more information than wires can. The slowest part of a fiber optic communication channel at present is the fiber optic switching device. At present, fiber optic signals are switched using various methods that are actuated by transistors. One such device, which is pictured in trade journals, is based on an array of mirrors. U.S. Pat. No. 6,178,033 issued to Joseph Ford et al, on Jan. 23, 2001, which teaches MICROMECHANICAL MEMBRANE TILT-MIRROR SWITCH, is an example of this kind of device. The mirrors are tilted to switch the optical signal from on to off or off to on. The tilting of the switch is actuated by circuits that use transistors, and so are bound to $10^{-9}$ seconds speeds at the best. U.S. Pat. No. 6,594,411, issued to Yueh Liang Chung et al, on Jul. 15 of 2003, which teaches OPTICAL SWITCH, makes mention of a piezoelectric element. The piezoelectric element is actuated by an electrical signal, which is again bound to the $10^{-9}$ second speeds that transistors can accomplish. U.S. Pat. No. 5,703,975 issued to William Miller et al, on Dec. 30, 1997, that teaches INTERFEROMETRIC SWITCH are physically long for the present need for miniaturized components. The components are more than a centimeter in length in William Miller's device.

SUMMARY OF THE INVENTION

BENDING ELEMENT LIGHT SWITCH uses the inability of electromagnetic waves to travel through a channel that is dimensionally smaller than the wave length to turn light off the light signal in a fiber optical channel. Opening up the fiber optical channel to a dimension large enough allows the BENDING ELEMENT LIGHT SWITCH to turn on the signal in an optical channel. A rod or element constructed of two different orientations of piezoelectric material will bend when exposed to an electric field of sufficient strength. The BENDING ELEMENT LIGHT SWITCH uses this bending of the piezoelectric element to effect the closing or opening of fiber optical channels. The electric field of light in the channel is the electric field that effects the change in the piezoelectric material. BENDING ELEMENT LIGHT SWITCH can switch faster than $10^{-11}$ seconds. This is 100 times faster than the MICROMECHANICAL MEMBRANE TILT-MIRROR SWITCH, OPTICAL SWITCH, or any transistor-actuated switch. BENDING ELEMENT LIGHT SWITCHES can be made smaller than 30 microns in length, less than three microns in width, and high depending on the specific wavelength to be used in the fiber optic channel. Millions of these switches can be made in the area of one of the INTERFEROMETRIC SWITCHES described above. BENDING ELEMENT LIGHT SWITCHES will also be 100 or more times faster than the INTERFEROMETRIC SWITCH. Fiber optic communication will be made 100 or more times faster using the BENDING ELEMENT LIGHT SWITCHS and components will be able to be made the size of computer chip components. The BENDING ELEMENT LIGHT SWITCH can use the light in one light channel to switch on or off the light in an adjacent light channel. The amount of information that can be transmitted across a fiber optic channel is far greater than can be transmitted across a normal telephone wire. Society needs fast communication of sound, pictures, and video signals. Currently the switching of these communication signals is limited by the speed of the transistor. Transistors can switch in about $10^{-9}$ seconds. For society to achieve fast switching of signals the BENDING ELEMENT LIGHT SWITCH is necessary. The BENDING ELEMENT LIGHT SWITCH can be built adjacent to each other so that the bending elements will lock or latch together. This latching function will open the door to computers that use light to process information. The latching switches can be used to store information and make memory devices. Computers that the BENDING ELEMENT LIGHT SWITCH that can latch will make possible will be capable of functioning 100 times, or more, faster than current computers.

BRIEF DESCRIPTION OF THE DRAWINGS

FIG. 1A is a drawing of the switch on, and

FIG. 1B is a drawing of the switch in the off state.

FIG. 2 is two BENDING ELEMENT LIGHT SWITCHES that are arranged to latch when actuated by the appropriate electric field. The electric field of light in light channels separated by piezoelectric elements causes the piezoelectric elements to bend into contact with each other in the latching switches. The ends of the piezoelectric elements are fashioned to catch on each other, becoming latched together.

FIG. 2A is BENDING ELEMENT LIGHT SWITCH that can latch in the latched state, and FIG. 2B is BENDING ELEMENT LIGHT SWITCH that can latch in the unlatched state.

FIG. 3 is a detail of latching switch latches.

FIG. 3A is a latch for a right angle or near right BENDING ELEMENT LIGHT SWITCH that can latch.

FIG. 3B is a latch for a straight angle or near straight angle BENDING ELEMENT LIGHT SWITCH that can latch. A BENDING ELEMENT LIGHT SWITCH may be in channels of different dimensions so that different wavelengths of light can be used to actuate them. The widths of the channels may be slightly different or the height of the channels may be slightly different.

BEST MODE FOR CARRING OUT THE INVENTION

Figure 1:
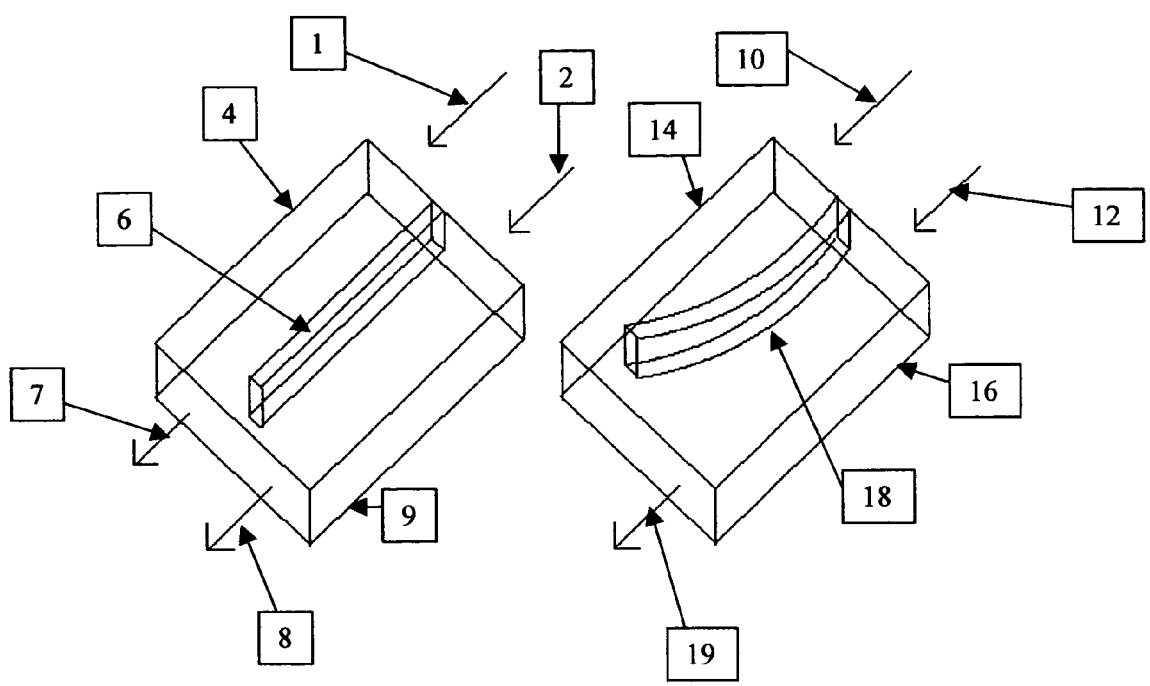
FIG. 1 is the BENDING ELEMENT LIGHT SWITCH. The electric field of the light in a channel parallel to the piezoelectric element causes the response of the piezoelectric material that shrinks the adjacent channel to dimensions too small to allow the light signal to pass through the channel.

The BENDING ELEMENT LIGHT SWITCH uses the characteristic of piezoelectric material that the dimensions of the piezoelectric element change when it is influenced by an electric field. The electric field of light in a channel is the electric field that the piezoelectric material responds to in this invention. Light channels are arranged so that they may be made larger or smaller as the piezoelectric materials change dimensions in response to the influence of the electric field. When a light channel is opened up from being so small it will not allow light signals to pass though them, the switch is on. This is accomplished by the response of the piezoelectric material to the electric field of light passing through the channel. When the channel is made small enough, light signals of cretin wavelengths will no longer pass through the smaller channel. When the light signals will not pass through the light channel that has been made smaller, the signal is switched off. Some piezoelectric materials have a crystal orientation that must be aligned with the electric field that will cause it to change shape. Other piezoelectric materials can be heated up in a magnetic field and oriented to respond in the desired direction to the electric field that will be applied. In constructing BENDING ELEMENT LIGHT SWITCHES, the piezoelectric elements will be constructed of two sides. One side of the bending element will have a crystal orientation along the length of the piezoelectric element. The other side of the piezoelectric element will have the crystal oriented perpendicular to the length of the bending element. The electric field will cause the element to bend as these two different orientations of piezoelectric material are affected by the electric field of the light in the channel. An alternative configuration is a flexible material on a bending element that on one side has piezoelectric material oriented perpendicular to the length of the member. Examples of piezoelectric materials that can be oriented in a magnetic field are lead zirconate and lead titanate or lead zicronate titanate, also called PZT. For an example, the electric field in volts to be derived from the power in watts of the light in the channel from a form of the Poynting vector equation which is written $E=(2 \mu_0 cP)^{1/2}$. Where $\mu_o$ is 4 pi×$10^{-7}$ Weber/amp-meter and c is 3×$10^8$ meters/second. Using this relation it is found that the voltage developed by a 150-milliwatt signal in a fourth of a micron channel is 10 volts. This voltage will be employed to actuate the BENDING ELEMENT LIGHT SWITCH. The voltage the light develops will change the dimensions of the 2065 Å channel by 40 Å when lead zecronate titonate is used. Lead zecronate titonate has a piezoelectric strain coefficient of 3.90×$10^{-10}$ meters/volt. 818 nm light (8180 Å) commonly used for fiber optics will be able to travel in a channel just bigger than 2045 Å and will not travel down a channel smaller. When the 2065 Å channel changes to 2014 Å light will be shut off for a wave length of 8180 Å or more, while light of a wave length of 8056 Å or less will still pass through. These wavelengths are used as an example. BENDING ELEMENT LIGHT SWITCHES are made of appropriate dimensions to accommodate wavelengths yards long or a few angstroms long. In the present invention, the switching mechanism is a bending piezoelectric element that bends in the presence of an electric field of appropriate orientation and power. The light signal that is switched on or off can be the same or different in wave length from the light signal that has the power to actuate the switch. The switching light can be the same longer or shorter in wavelength than the light that is switched on or off. The electric field of the switch may be imposed on a conductor near the switch to cause the switching. Such an element can be composed of two sides with a flexible material film between the two sides. The material could be metal, ceramic, or organic. It must be conductive and flexible. The method for fabricating the bending element is as follows: First a non-oriented piezoelectric layer is deposited on a substrate that can be a silicon wafer with a metal coating. Then channels are etched in the piezoelectric layer. The flexible material film is deposited into the channels that were etched. The excess material is removed, and the piezoelectric layer is oriented along the length of the elements that will be the bending elements. The side that will be bent toward is then oriented perpendicular to the length of the bending element by imposing a high electric field to the flexible conductive film. The high electric field is maintained on the side that will be oriented perpendicular to the length of the bending element by a second flexible conductive material film that is near to the side of the bending element that is to be oriented perpendicular to the length of the element. The proximity of the second conductive film on the one side assures that only one side is reoriented to the perpendicular orientation, and the other side can maintain the orientation along the length of the element. The orientation along the length of the element is aligned using a magnetic field in the plane of the surface of the wafer. An element constructed in this fashion, when an electric field of an appropriate light signal interacts with it, will bend. As has been discussed if the element bends a sufficient distance the light channel will be closed to the passage of light signals. BENDING ELEMENT LIGHT SWITCHES may also be made with a bending element that is composed of a flexible metal side and a piezoelectric side that is oriented perpendicular to the bending element. In this case, the element bends because the perpendicularly oriented piezoelectric material is attached to the flexible metal that does not change with the light. These bending elements generally require more light power to effect the bending than the bending elements that are composed of two sides of piezoelectric material with opposite orientations. Further, if two such elements with ends that can latch are bent into a latched state the light signal that can be turned off and the latching switch will maintain the off state once there is no light in the channel. A latched switch can be unlatched by the application of light in the proper sequence to bend the elements affecting an unlatching. These latching switches can be made so they stay permanently latched once latched. The drawings illustrate the way the BENDING ELEMENT LIGHT SWITCH and latching light switches function. In FIG. 1A, the arrow numbered 1 is the arrow that indicates the light moving trough the light channel into a BENDING ELEMENT LIGHT SWITCH on one side. The side that arrow 1 is going into is the on and off side of the BENDING ELEMENT LIGHT SWITCH. Arrow 2 indicates the light moving through the BENDING ELEMENT LIGHT SWITCH on the triggering side. Rectangular channel 4 is the on and off side of the BENDING ELEMENT LIGHT SWITCH, the side that the bending element bends toward. Rectangular solid 6 is the straight bending element. The element is not being acted upon by the electric field of a switching signal that would be of sufficient power to cause the element to bend. Rectangular channel 9 is the side of the BENDING ELEMENT LIGHT SWITCH that the bending element bends away from. Arrow 7 is the light coming out of the BENDING ELEMENT LIGHT SWITCH when the bending element is not bent. The switch is on in this state. Arrow 8 is the light coming out of the side that the bending element bends away from. This bending can turn on or off the signal passing through the other side of the switch by the electric field of the light passing through the switch.

In FIG. 1B, arrow 10 is the light coming into the BENDING ELEMENT LIGHT SWITCH that will be shut off by the closing of the channel by the bending element when it is bent. Arrow 12 is indicating the light entering the side that the bending element can bend away from and shut off the light signal in the other side of the switch. The light indicated by arrow 12 is of sufficient power to actuate the switch. Light channel 14 is the light channel that the bending element bends into to shut off the signal. Light channel 16 is the side of BENDING ELEMENT LIGHT SWITCH that the bending element bends away from. Bent element 18 is the bending element in the bent state. No light is passing through the side of the switch that the bending element has moved into. The switch is in the off state. Arrow 19 is the light still passing through the side of the BENDING ELEMENT LIGHT SWITCH that is the direction that the bending element bends away from to turn off the light signal.

In FIG. 2A, Arrow 20 indicates the light passing into the side of the BENDING ELEMENT LIGHT SWITCH that can latch that is constructed to allow the signal to be turned on or off if the latching elements are bent and latched. Arrow 22 indicates the light passing into the side of the BENDING ELEMENT LIGHT SWITCH that can latch that the bending elements bends away from when they bend. The light is not of sufficient power to actuate the switch. Rectangular channel 24 is the first side of the BENDING ELEMENT LIGHT SWITCH that can latch on the side that the bending elements bend toward when they bend. Bend element 26 is the first half of the BENDING ELEMENT LIGHT SWITCH that is bent and latched to shut off the light signal. Rectangular channel 28 is the side of the light channel that is the side that the bending element can bend away from and shut off the signal. Rectangular channel 30 is the second half of the light channel on the side that the bending and latching elements can bend toward to latch and shut off the light from passing through the channel. Bending element 32 is the second half of the BENDING ELEMENT LIGHT SWITCH that can latch that is bent and latched so no light can pass through. The switch is off. Rectangular channel 34 is the second half of BENDING ELEMENT LIGHT SWITCH that can latch that is the side of the switch that the bending elements bend away from. Arrow 36 is the light passing out of the side of the BENDING ELEMENT LIGHT SWITCH that can latch that is the side that the direction that the bending and latching elements bend away from. It will be noted that there is no arrow on the side that the elements bend toward indicating light is not coming out of the switch.

In FIG. 2B, Arrow 40 is the light entering the BENDING ELEMENT LIGHT SWITCH that can latch that is constructed to latch on the side that the light signal can be turned on or off when the elements bend and latch. This is the side toward which the bending elements bend, when they bend. Rectangular light channel 44 is the first half of the BENDING ELEMENT LIGHT SWITCH that can latch that the bending element bends into this side of the switch when it bends. Arrow 42 is the light entering the BENDING ELEMENT LIGHT SWITCH that has been constructed to latch on the side away from the direction that the bending element bends. The light in this channel is not of sufficient power to actuate the switch. Bending element 48 is the first element in the BENDING ELEMENT LIGHT SWITCH that can latch. It is in the unbent state. The switch is in the on state. There is not sufficient power in the switching light to cause the element to bend and latch. Rectangular channel 50 is the second half of the BENDING ELEMENT LIGHT SWITCH that can latch away from the direction that the bending element will bend. The light in this side of the BENDING. ELEMENT LIGHT SWITCH that can latch will not be turned on or off by the bending of the elements. Rectangular light channel 54 is the second half of the channel in the BENDING ELEMENT LIGHT SWITCH that can latch that the bending elements bend into and causes the light signal to be tuned on or off by the bending of the latching elements. Bending element 52 is the second bending element that latches with bending element 48 when the switch is latched off. It is not bent. There is not enough power in the switching light to cause the element to bend and latch. The switch is in the on state. Arrows 56 and 58 are the light passing out of the BENDING ELEMENT LIGHT SWITCH which is made to latch in the on state.

FIG. 3A is a drawing of two latching elements as they could be made to latch. Bending element 60 is one bending element that would be latched into position when caught by the other element of the pair numbered 62. FIG. 3B is a drawing of two latching elements as they could be made to latch. Bending element 64 is one bending element that would latch into position when caught by the other bending element of the pair. The other bending element of the two elements is bending element 66. These latching shapes are given as an example. Other latching shapes could be used to perform the desired function of latching once bent into position. Some latching geometry's will work better for the BENDING ELEMENT LIGHT SWITCH that are arranged at right angles while others will be better used in a near straight angle configuration. The three drawings of the BENDING ELEMENT LIGHT SWITCH are schematic drawings. In actual switches, additional layers of material will be used to secure, cover, and align the fiber optic switches in a fiber optic assembly.

What I claim as my invention is:

1. An on and off switch for light in an optical wave guide, the on and off switch comprising:

two parallel light channels; and a bending element between the two parallel light channels, the bending element comprises piezoelectric material that bends in response to an electric field produced by a switching light that is applied to one of the two parallel light channels, wherein the bending element is configured relative to the two parallel light channels such that a light signal is:

a) able to pass through one of the two parallel light channels when the switching light is not applied to one of the two parallel light channels; and b) not able to pass through one of the two parallel light channels when the switching light is applied to one of the two parallel light channels.

2. The on and off switch of claim 1 wherein the bending element comprises two sides of piezoelectric material connected to a central flexible material part, wherein the piezoelectric material on one side of the bending element is oriented along the length of the bending element and wherein the piezoelectric material on the other side of the bending element is oriented perpendicular to the length of the bending element.

3. The on and off switch of claim 1 wherein the bending element comprises piezoelectric material on only one side of the bending element.

4. The on and off switch of claim 1 further comprising means for maintaining, in the absence of the switching light, the shape of the bending element in a state that prevents the light signal from passing through one of the two parallel light channels.

5. An on and off switch for light in an optical wave guide, the on and off switch comprising:

two parallel light channels;

two bending elements between the two parallel light channels, the bending elements comprising piezoelectric material that bends in response to an electric field produced by a switching light that is applied to one of the two parallel light channels, wherein the bending elements are configured relative to the two parallel light channels such that a light signal is:

a) able to pass through one of the two parallel light channels when the switching light is not applied to one of the two parallel light channels; and b) not able to pass through one of the two parallel light channels when the switching light is applied to one of the two parallel light channels; and means for maintaining, in the absence of the switching light, the shape of the two bending elements in a state that prevents the light signal from passing through one of the two parallel light channels.

6. The on and off switch of claim 5 wherein the means for maintaining the shape of the two bending elements comprises a latch at one end of at least one of the two bending elements.

7. The on and off switch of claim 6 wherein the two bending elements are latched together at the latch in response to the switching light.

8. The on and off switch of claim 7 wherein the latch is configured such that once latched together, the two bending elements may be unlatched by applying light to the latched bending elements.

9. The on and off switch of claim 7 wherein the latch is configured such that once latched, the two bending elements may not be unlatched.

10. The on and off switch of claim 7 wherein, in response to the switching light, the bending elements meet at one of:
a) an acute angle to latch;
b) a perpendicular angle to latch; and
c) a straight angle to latch.

11. The on and off switch of claim 5 wherein at least one of the bending elements comprises a hook on its cad so that once bent by the electric field the bending elements latch in the bent state and do not unlatch once the electric field is gone.

12. The an and off switch of claim 5 wherein the bending elements each comprise two sides of piezoelectric material connected to a central flexible material part, wherein the piezoelectric material on one side of each bending clement is oriented along the length of the bending element and wherein the piezoelectric material on the other side of each bending element is oriented perpendicular to the length of the bending element.

13. An on and off switch for light in an optical wave guide, the on and off switch comprising:
two parallel light channels; and
a bending element between the two parallel light channels, the bending element comprising piezoelectric material that bends in response to an electric field produced by a switching light that is applied to one of the two parallel light channels;
wherein the bending element is configured relative to the two parallel light channels such that the on and off switch is a) on when the bending element is not bent; and b) off when the bending element is bent.

14. An on and off switch for light in an optical wave guide, the on and off switch comprising:
two parallel light channels;
two bending elements, the bending elements comprising piezoelectric material that bends in response to an electric field produced by a switching light that is applied to one of the two parallel light channels; and
means for latching the two bending elements together in response to the switching light;
wherein the bending elements are configured relative to the two parallel light channels such that the on and off switch is a) on when the bending elements are not latched together; and b) off when the bending elements are latched together.

15. A method for operating an optical switch, the method comprising:
applying a light signal to a signal channel that comprises a bending element, wherein the bending element comprises a piezoelectric element;
applying a switching light to the bending element to change the shape of the bending element such that the light signal is prevented from passing through the signal channel; and
maintaining, in the absence of the switching light, the shape of the bending element in a state that prevents the light signal from passing through the signal channel.

16. The method of claim 15 wherein maintaining the shape of the bending element comprises latching the bending element in a bent state.

17. The method of claim 15 wherein latching the bending element in a bent state comprises latching the bending element to a second bending element.

18. The method of claim 15 wherein applying a switching light to the bending element comprises passing the switching light through a switching light channel.

19. The method of claim 18 wherein the switching light channel is formed in part by the bending element.

20. An optical switch comprising:
a switching light channel configured to guide a switching light;
a signal channel configured to guide a light signal;
a bending element between the switching light channel and the signal channel, wherein the bending element comprises a piezoelectric element, wherein the shape of the bending element changes in response to application of the switching light to the switching light channel such that the light signal is prevented from passing through the signal channel.

21. The optical switch of claim 20 further comprising means for maintaining, in the absence of the switching light in the switching light channel, the shape of the bending element in a state that prevents the light signal from passing through the signal channel.

22. The optical switch of claim 21 further comprising a second bending element between the switching light channel and the signal channel, wherein the means for maintaining the shape of the bending element comprises a latch at one end of at least one of the two bending elements.

23. The optical switch claim 22 wherein the two bending elements are latched together at the latch in response to the switching light.

24. An optical switch comprising:
a switching light channel configured to guide a switching light;
a signal channel configured to guide a light signal;
two bending elements between the switching light channel and the signal channel, wherein the bending elements comprise piezoelectric elements, wherein the shape of the bending elements changes in response to application of the switching light to the switching light channel such that the light signal is prevented from passing through the signal channel; and
means for maintaining, in the absence of the switching light in the switching light channel, the shape of the bending elements in a state that prevents the light signal from passing through to signal channel.

25. The optical switch of claim 24 wherein the means for maintaining the shape of the two bending elements comprises a latch at one end of at least one of the two bending elements.

26. The optical switch of claim 25 wherein the two bending elements are latched together at the latch in response to the switching light.

27. The optical switch claim 24 wherein the two bending elements are latched together in response to the switching light.

* * * * *